Figure 1:
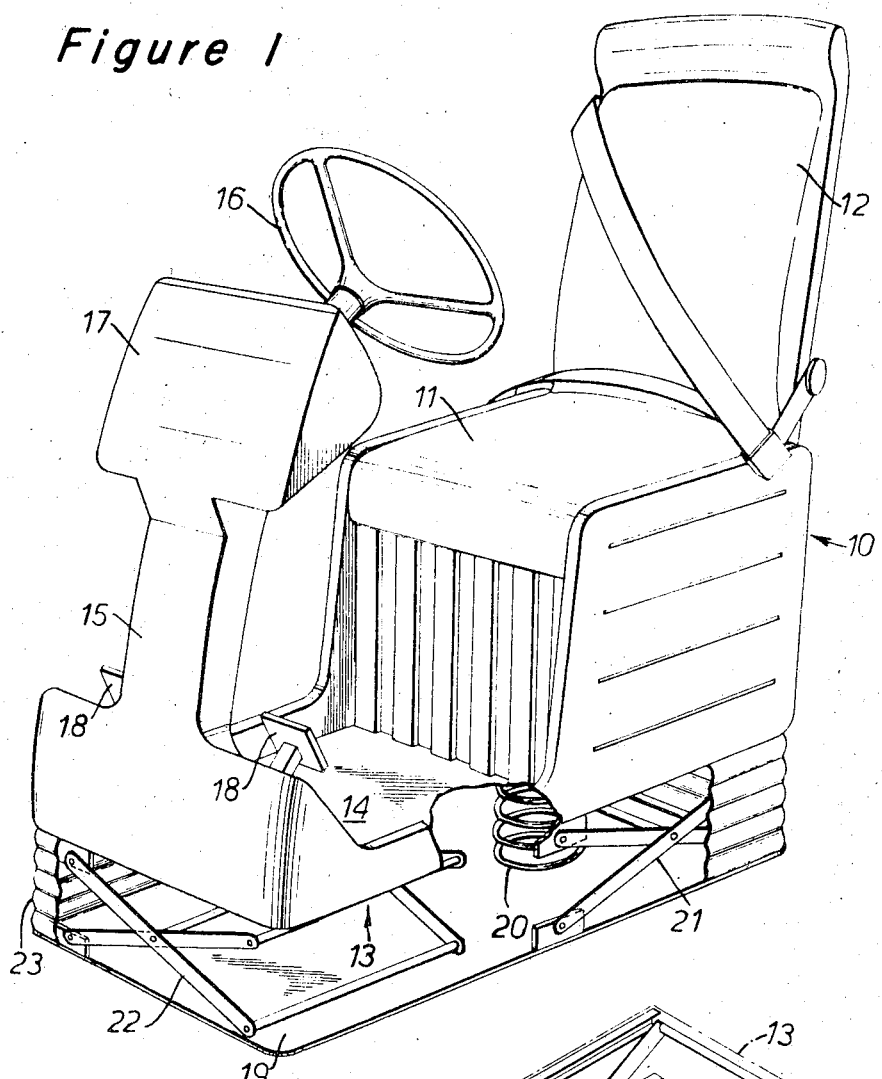

United States Patent [19]
Lacey

[11] 3,774,711
[45] Nov. 27, 1973

[54] VEHICLE CONTROL ASSEMBLY

[75] Inventor: Robert R. Lacey, Kingsthorpe, England

[73] Assignee: Universal Oil Products Company, Des Plaines, Ill.

[22] Filed: Dec. 30, 1971

[21] Appl. No.: 214,155

[30] Foreign Application Priority Data
Dec. 31, 1970 Great Britain................... 61,960/70

[52] U.S. Cl............... 180/77 R, 108/136, 248/399, 267/131
[51] Int. Cl....................... B60k 35/00, B60k 27/00
[58] Field of Search..................... 180/77 R, 77 TC, 180/77 S, 89 R, 89 A; 296/35 R, 35 A; 248/399; 108/136; 267/131

[56] References Cited
UNITED STATES PATENTS
3,616,709  11/1971  Malm............................... 180/77 R
1,734,776  11/1929  Pallenberg...................... 248/399 X
3,123,380  3/1964   Grim et al...................... 180/89 R X
3,420,568  1/1969   Henriksson et al.............. 180/89 R
3,391,811  7/1968   Barnes........................... 180/77 S X
3,051,259  8/1962   Lorenz........................... 296/35 R X
3,182,605  5/1965   Brasher.......................... 180/77 S X
3,140,851  7/1964   Bilancia.......................... 248/399

Primary Examiner—Kenneth H. Betts
Assistant Examiner—John P. Silverstrim
Attorney—James R. Hoatson, Jr. et al.

[57] ABSTRACT

A vehicle operator's seat and the vehicle's operating controls such as the steering wheel and floor pedals are isolated from vibrations of the vehicle by being mounted on a common support base which is attached to the vehicle cab or frame by means of a spring suspension. The spring suspension preferably comprises a scissor-type linkage and a spring.

4 Claims, 2 Drawing Figures

VEHICLE CONTROL ASSEMBLY

This invention relates to the mounting of the driver's seat and the controls in a vehicle.

Suspension seats are now well known and comprise a base part fixed to the vehicle and an upholstered seat part mounted on the base part through a spring suspension. The spring suspension permits the seat part to move substantially vertically relative to the base part, and damps the transmission of vibrations from the vehicle to the seat occupant. The permissible extent of this movement however is limited by the consideration that the driver of the vehicle must maintain control over the vehicle, and the greater the extent to which the driver is isolated from vehicle vibration, the greater is the relative movement between the driver and the controls of the vehicle during vibration.

Again, although reduction of vibration in the drivers seat assists in reducing driver fatigue, the driver is still subject to considerable strain resulting from the vibration of the steering column and other controls and the need to maintain accurate control in spite of vibrations due to movement of the vehicle and vibrations transmitted from the engine of the vehicle.

One object of the invention is to reduce driver fatigue in a vehicle.

According to one aspect of the invention there is provided a vehicle control assembly comprising a seat mounted for upward and downward movement relative to a base part through a spring suspension, and a support, rigidly connected to the seat, on which the vehicle controls are mounted so that the seat and the controls move together relative to the base part.

According to another aspect of the invention there is provided a vehicle control assembly comprising a common rigid support on which are mounted a driver's seat, control pedals and a steering column, said common rigid support being itself mounted on a spring suspension, the assembly being capable of installation in a vehicle cab to reduce the transmission of vibration from the vehicle both to the driver and the controls operated by the driver.

Figure 2:
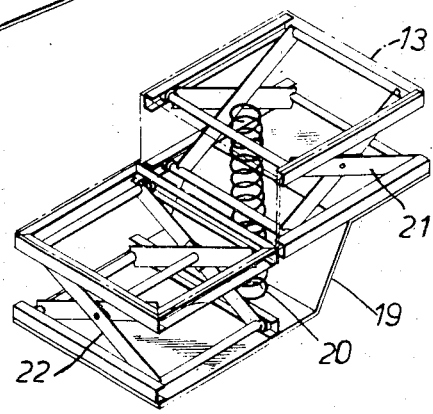

In the drawings:

FIG. 1 is a perspective view of one form of vehicle control assembly including a spring suspension; and FIG. 2 is a perspective view of a modified form of spring suspension suitable for installation in a vehicle cab having a stepped floor.

As shown in the drawing, the vehicle control assembly comprises a seat 10 formed by a seat cushion 11 and squab 12 supported above a platform 13. The platform forms a rigid support for the seat and a floor 14 in front of the seat, and carries a steering column 15 supporting a steering wheel 16, and an instrument binnacle 17, the pedals 18 (e.g. brake, accelerator and clutch) being mounted in the platform.

The platform is supported above a base part 19, bolted to the floor of the vehicle cab, by a spring suspension which can be of any known type. Conveniently, the suspension will comprise scissor-type linkages to maintain vertical movement of the seat part, and either a torsion bar spring acting on the arms of the linkages or a hydropneumatic or coil spring 20 acting directly between the platform and the base part. In particular two scissor-type linkages 21, 22 are provided, one with its pivot axes aligned with the direction of the vehicle and the other with its pivot axes transverse thereto to give stability both longitudinally and laterally.

The space between the platform and the base part is covered by a horizontally pleated skirt member 23 for safety reasons.

Preferably the seat part is supported above the platform through a height riser mechanism (not shown) operable by the seat occupant to raise or lower the seat part to match the height of the seat occupant.

In a modification of the vehicle control assembly, suitable for use in a vehicle cab having a stepped floor, the platform (see FIG. 2) is stepped to provide an upper step on which the seat is mounted and a lower step on which the steering column and pedals are mounted, a separate scissor-linkage suspension assembly being mounted under each step and a coil spring being located below the seat.

It will be appreciated that all the vehicle controls, except for steering, can be operated electrically, hydraulically or pneumatically from the pedals or instrument binnacle of the vehicle control assembly, and the steering can be controlled via a mechanical linkage including a splined sliding coupling and universal joints.

I claim:

1. A vehicle control assembly comprising a common rigid support, said support being stepped to provide an upper step and a lower step, said upper step having a seat mounted thereon, said lower step having a steering column and control pedals mounted thereon, each of said steps having a spring suspension assembly thereunder, said spring suspension assemblies comprising two interconnected parallel-spaced pairs of scissors-acting suspension levers, the pivot axes of the levers of one suspension assembly under one of said steps extending in the direction of movement of the vehicle, and the pivot axes of the levers of the other suspension assembly under the other of said steps being transverse to said direction of movement, whereby said assemblies reduce transmission of vibration both to the driver and the controls operated by the driver.

2. A vehicle control assembly according to claim 1 wherein the pivot axes of said levers of the suspension assembly under said upper step extend in the direction of movement of said vehicle, and the pivot axes of said levers of the suspension assembly under the lower of said steps is transverse to said direction of movement.

3. A vehicle control assembly according to claim 1 wherein an instrument panel is fixed relative to the steering column.

4. A vehicle control assembly according to claim 1 wherein the spring suspension further comprises a coil spring located in the part of the suspension below the seat.

* * * * *